United States Patent
Flavin et al.

(10) Patent No.: US 9,811,687 B2
(45) Date of Patent: Nov. 7, 2017

(54) COMMON LOCATION OF USER MANAGED AUTHORIZATION

(71) Applicant: International Business Machines Corporation, Armonk, NY (US)

(72) Inventors: Robert A. Flavin, Yorktown Heights, NY (US); David G. Robinson, Cary, NC (US); Andrew B. Smith, Morrisville, NC (US)

(73) Assignee: International Business Machines corporation, Armonk, NY (US)

(*) Notice: Subject to any disclaimer, the term of this patent is extended or adjusted under 35 U.S.C. 154(b) by 612 days.

(21) Appl. No.: 13/838,609

(22) Filed: Mar. 15, 2013

(65) Prior Publication Data

US 2014/0283023 A1    Sep. 18, 2014

(51) Int. Cl.
*G06F 21/60* (2013.01)
*G06F 21/62* (2013.01)
*G06F 21/45* (2013.01)

(52) U.S. Cl.
CPC .......... *G06F 21/6263* (2013.01); *G06F 21/45* (2013.01); *G06F 21/604* (2013.01)

(58) Field of Classification Search
CPC .......... G06F 21/00; G06F 21/45; G06F 21/60; G06F 21/604; G06F 21/62–21/6245; G06F 21/6263; G06F 21/6272; G06F 2221/2141; H04L 63/10; H04L 63/102
USPC ........................................... 726/1, 21; 716/4
See application file for complete search history.

(56) References Cited

U.S. PATENT DOCUMENTS

| | | | |
|---|---|---|---|
| 4,714,995 A | 12/1987 | Materna et al. | |
| 6,144,959 A | 11/2000 | Anderson et al. | |
| 6,820,204 B1* | 11/2004 | Desai | G06F 21/6245 705/51 |
| 6,845,378 B1 | 1/2005 | Pauly et al. | |
| 7,028,073 B1 | 4/2006 | Bui et al. | |
| 7,277,940 B2 | 10/2007 | Pauly et al. | |

(Continued)

OTHER PUBLICATIONS

Chacko, et.al, Mobile Computing SMS Architecture, PDF created Mar. 11, 2012 [online]. Retrieved on Jun. 17, 2016. Retrieved from the internet<URL:http://memberfiles.freewebs.com/46/92/89279246/documents/MOBILE%20COMPUTING.pdf>.*

(Continued)

*Primary Examiner* — Minh Dinh
(74) *Attorney, Agent, or Firm* — Yee & Associates, P.C.; Lisa J. Ulrich

(57) ABSTRACT

A method and apparatus for managing authorizations to access personal data of a user is disclosed. A computer retrieves a set of authorizations for a plurality of web based applications, wherein an authorization enables an application of the plurality of web based applications to access at least a portion of the personal data of the user. The computer presents the set of authorizations on a graphical user interface. The computer receives a user input indicating a change to a particular authorization in the set of authorizations for a particular web based application in the plurality of web based applications. Responsive to receiving the user input indicating the change to the particular authorization in the set of authorizations, the computer then stores the change to the particular authorization in the set of authorizations for the plurality of web based applications to access the personal data.

20 Claims, 6 Drawing Sheets

(56) References Cited

U.S. PATENT DOCUMENTS

| | | | | |
|---|---|---|---|---|
| 2002/0188572 | A1* | 12/2002 | Bleizeffer | G06F 21/6218 705/64 |
| 2003/0018483 | A1* | 1/2003 | Pickover | G06F 21/64 705/1.1 |
| 2009/0276771 | A1 | 11/2009 | Nickolov et al. | |
| 2010/0185656 | A1* | 7/2010 | Pollard | 707/769 |
| 2011/0040736 | A1* | 2/2011 | Kalaboukis | G06F 21/6245 707/694 |
| 2011/0197065 | A1 | 8/2011 | Stauth et al. | |
| 2011/0209064 | A1* | 8/2011 | Jorgensen | G06F 9/4445 715/733 |
| 2012/0110650 | A1 | 5/2012 | Van Biljon et al. | |
| 2012/0210244 | A1* | 8/2012 | de Francisco Lopez | H04L 63/102 715/747 |
| 2013/0174211 | A1* | 7/2013 | Aad | G06F 21/604 726/1 |
| 2013/0185784 | A1* | 7/2013 | Tamura | H04L 63/0815 726/9 |
| 2013/0298138 | A1* | 11/2013 | Avadhanam | G06F 9/468 719/313 |
| 2014/0059695 | A1* | 2/2014 | Parecki | G06F 21/60 726/26 |
| 2014/0237610 | A1* | 8/2014 | Vandervort | G06F 21/60 726/26 |

OTHER PUBLICATIONS

Hammer-Lahav et al., "The OAuth 2.0 Authorization Protocol draft-ietf-oauth-v2-13," Internet Engineering Task Force, Feb. 2011, 43 pages. Retrieved Nov. 26, 2012 from http://tools.ietf.org/html/draft-ietf-oauth-v2-13.

"OpenSocial Social API Server Specification 2.5.0 Draft," OpenSocial and Gadgets Specifcation Group, Aug. 2012, 24 pages. Retrieved Nov. 26, 2012 from http://http://opensocial-resources.googlecode.com/svn/spec/trunk/Social-API-Server.xml.

"WebFinger Protocol," webfinger, Jan. 2010, 5 pages. Retrieved Nov. 26, 2012 from http://code.google.com/p/webfinger/wiki/WebFingerProtocol.

Sakimura et al., "OpenID Connect Standard 1.0—darft 07," OpenID Foundation, Dec. 2011, 34 pages. Retrieved Nov. 26, 2012 from http://http://openid.net/specs/openid-connect-standard-1_0-07.html.

\* cited by examiner

COMMON LOCATION OF USER MANAGED AUTHORIZATION

BACKGROUND

1. Field

The disclosure relates generally to data processing systems and, in particular, to managing access to personal data. Still more particularly, the present disclosure relates to a method, apparatus, and computer program for managing authorizations for accessing personal data of a user and for storing changes to the authorizations.

2. Description of the Related Art

Currently when web based applications access personal data of a user, the web based applications must first have an authorization from the user to access the personal data. Personal data of the user accessed by the web based applications can include anything from health records, to automotive repair data, to lists of friends on a social networking site.

Users wishing to grant authorization for access to personal data in a web based application typically do so by logging into the web based application and making a selection to grant the authorization for access to the personal data. Similarly, users wishing to revoke authorization for access to personal data in the web based applications do so by again logging into the web based application and making another selection to revoke the authorization for access to the personal data.

When a user wishes to see all of the authorizations currently granted and/or revoked in a plurality of web based applications the user must log into each of the plurality of web based applications to browse the current authorizations. The user may desire to change authorizations for access to particular portions of the personal data or for particular types of web based applications. However, the user may not know which of the plurality of web based applications have access to each particular portion of the personal data. Further, the user may not wish to spend the time to make the change in each of the plurality of web based applications. Still further, when making a particular change for a particular authorization in a plurality of web based applications, the possibility of error increases with the number of web based applications. For example, the user may make an incorrect selection when making the particular change. As another example, the user may forget to make the particular change to a corresponding authorization in one of the plurality of web based applications.

Therefore, it would be desirable to have a method, apparatus, and computer program product that takes into account at least some of the issues discussed above, as well as possibly other issues.

SUMMARY

In one illustrative embodiment, a method, apparatus, and computer program product for managing authorizations to access personal data of a user is disclosed. An apparatus retrieves a set of authorizations for a plurality of web based applications to access personal data, wherein an authorization enables an application of the plurality of web based applications to access at least a portion of the personal data of the user. The apparatus presents the set of authorizations on a graphical user interface. The apparatus receives a user input indicating a change to a particular authorization in the set of authorizations for a particular web based application in the plurality of web based applications. Responsive to receiving the user input indicating the change to the particular authorization in the set of authorizations, the apparatus then stores the change to the particular authorization in the set of authorizations for the plurality of web based applications to access the personal data.

DETAILED DESCRIPTION

Figure 1:
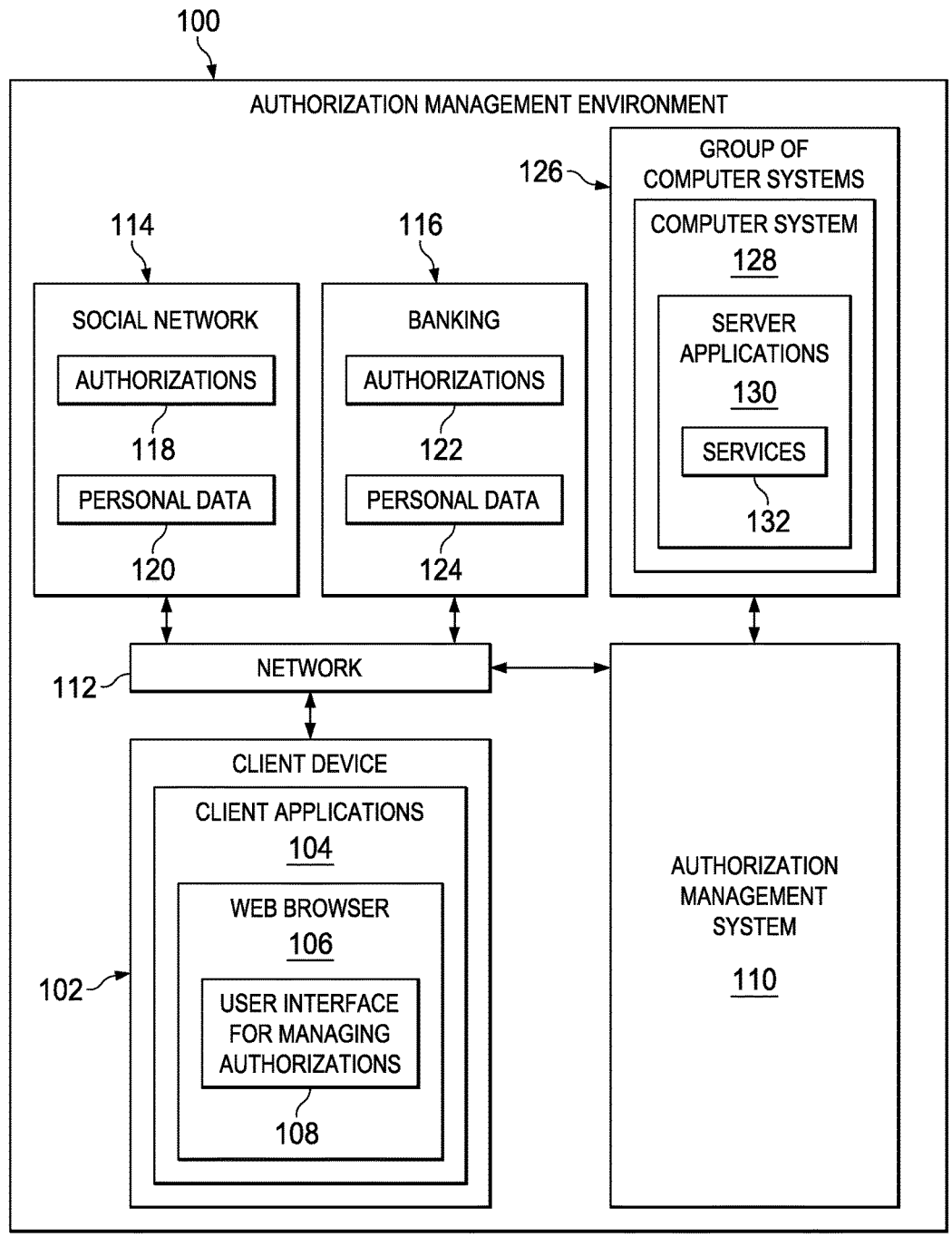
FIG. 1 is an illustration of an authorization management environment for managing authorizations to access personal data in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may be run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The illustrative embodiments recognize and take into account that existing web based applications are available for sharing personal data of users with entities. Web based applications typically run on a web server. These web based applications communicate with web browsers by generating web pages and sending the web pages to a web browser. The generated web pages are typically displayed on a display screen by a web browser running on a computing device. For example, a web based application for a banking web site may generate a web page for a bank account for an owner of the bank account. In this example, the owner of the bank account may make selections for managing authorizations to personal data, such as an authorization to allow access to bank account information by an entity such as by a government taxing agency, a financial advisor, a relative, and any other suitable entity for accessing the personal data available through the web based application of the banking web site.

As used herein, the term "computing device" means a hardware device with a processor unit and a capability to display information on a display device and may also include the capability to emit audio on a speaker. For example, the computing device may be a computer, a television with a processor unit, a smart phone, and any other suitable device.

The illustrative embodiments also recognize and take into account that existing web based applications are available for sharing personal data of users of social networking web sites. As used herein, personal data is data about a person that may include information about the person that is of a private nature and information about the person that is of a public nature. Personal data may include, for example, photos, opinions, relationships, memberships, instant messaging identifiers, email identifiers, phone numbers, presence information, and any other personal data of a private and public nature. For example, when a user is using a web based application of a social network, the web based application may identify the user as present and show a photo representative of the user to other users of the web based application, as well as provide access to other data selected by the user as available for the others users to see and use when also using the web based application of the social network. In this example, the identification of the user as present and the photo representative of the user being shown to other users of the web based application may be subject to an authorization selected by the user to allow the identification of the user as present and allow the photo representative of the user to be shown.

The illustrative embodiments further recognize and take into account that existing web based applications support using tokens, such as open standard for authorization (OAuth) tokens and OpenID® Connect bearer tokens, as a means to provide access to personal data (Open is a trademark of OpenID Foundation, in the United States and other countries, or both). For example, these tokens may comprise a record of a delegation of authority to access personal data of a user of a web based application. Upon presenting a token delegated to a first user of the web based application to access personal data of a second user, the web based application may then validate the token and provide the first user access to the personal data of the second user.

The illustrative embodiments further recognize and take into account that existing web based applications may also support using application programming interfaces (APIs), such as representational state transfer (REST) application programming interfaces. These APIs may be used by the web based applications to allow remote applications access to information managed by the web based applications. For example, a web based application having REST APIs for access to personal data may allow a remote application to use the REST APIs to retrieve and change the personal data.

Thus, the different illustrative embodiments provide a method, apparatus, and computer program product to manage authorizations to access personal data of a user. For example, the different illustrative embodiments may use a process for managing authorizations for a plurality of web based applications to access personal data. For example, an authorization management system may retrieve a set of authorizations for a plurality of web based applications. An authorization in the set of retrieved authorizations by the authorization management system enables an application of the plurality of web based applications to access at least a portion of the personal data of the user. The authorization management system may also present the set of authorizations on a graphical user interface. The authorization management system may then receive user input indicating a change to a particular authorization in the set of authorizations for a particular web based application in the plurality of web based applications. Responsive to receiving the user input indicating the change to the particular authorization in the set of authorizations, the authorization management system may then store the change to the particular authorization in the set of authorizations for the plurality of web based applications to access the personal data. A "set," as used herein with reference to items, means one or more items. For example, "set of authorizations" is one or more authorizations.

With reference now to the figures and, in particular, with reference to FIG. 1, an illustration of an authorization management environment for managing authorizations to access personal data is depicted in accordance with an illustrative embodiment. In this illustrative example, authorization management environment 100 is depicted in block diagram form.

Client applications 104 run on computing device 102 within authorization management environment 100. Client applications 104 may take various forms. For example, client applications 104 may include web browser 106. Client applications 104 also may include in addition to or in place of web browser 106 at least one of an authorization application, a notification application, a database application, a smart-phone application, an audio based web browser, and other suitable types of applications. In these illustrative examples, the web browser may display information on a display screen and may also present information to by using a speaker to emit audio.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, client applications 104, such as web browser 106 present user interface for managing authorizations 108 to users of client device 102. In these illustrative examples, user interface for managing authorizations 108 may be displayed in web browser 106 in a process managing authorizations using authorization management system 110. As depicted, client applications 104 in client device 102 may communicate with authorization management system 110 over network 112. As also depicted, authorization management system 110 and client applications 104 in client device 102 may communicate with social network 114 and banking 116 over network 112.

In these illustrative examples, social network 114 is a web based application having authorizations 118 to personal data 120. For example, social network 114 may provide services to search for and browse personal data 120 about a member of social network 114. In this example, the member of social network 114 may have previously selected whether to enable or disable one or more authorizations 118 to the search and browse features of social network 114 for one or more portions of personal data 120.

As depicted, banking 116 is a web based application having authorizations 122 to personal data 124. For example, banking 116 may provide services to modify personal data 124 for a bank account. In this example, a user authorized to make modifications to the bank account may login to banking 116 to perform the authorized modifications to the bank account. More particularly, in this example, user interface for managing authorizations 108 may be used in response to a message received at client device 102.

For example, responsive to a message being received at client device 102 associated with the bank account when the user is using client device 102, authorization management system 110 may subsequently be used by client device 102 to retrieve user interface for managing authorizations 108. In this example, web browser 106 displays retrieved user interface for managing authorizations 108 in a process for managing authorizations 122 to personal data 124 for the bank account.

In these illustrative examples, computer system 128 within group of computer systems 126 is one or more computers. Also, as used herein, "group of" when used with reference to items means one or more items. For example, group of computer systems 126 is one or more computer systems. When computer system 128 is more than one computer, the computer system may take the form of a computer cluster, group of computer systems 126, or other configurations of computer systems configured to run server applications 130.

Authorization management system 110 uses server applications 130 located on computer system 128 in group of computer systems 126. A computer system is one or more computers in these illustrative examples. Server applications 130 may be any applications configured to process communications to provide services 132. Server applications 130 may be, for example, at least one of a database server, a file transfer protocol (FTP) server, a web server, a mail server, and/or other suitable types of applications. Services 132 may include, for example, at least one of retrieving a file, retrieving a webpage, retrieving information, writing information, downloading a program, and/or other suitable types of access.

Authorization management system 110 may be implemented using hardware, software, or a combination of the two. In these illustrative examples, authorization management system 110 is configured to manage authorizations using group of computer systems 126. Communications sent by client applications 104 in client devices such as client device 102 are processed by authorization management system 110. In these illustrative examples, authorization management system 110 is configured to use services 132 of server applications 130. For example, authorization management system 110 may use a service in services 132 to search authorizations 118 to find one or more authorizations to one or more portions of personal data 120. As another example, authorization management system 110 may use another service in services 132 to search banking 116 to retrieve and modify authorizations 122 to personal data 124. In these illustrative examples, authorization management system 110 may be implemented as a centralized authorization server. As used herein, the term "centralized authorization server" is a server, such as a web server, that is used by users as a central location for managing authorizations to access personal data by a plurality of web based applications.

The illustration of authorization management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional social networks, in addition to social network 114, may be present within authorization management environment 100. As another example, a plurality of web based applications, including but not limited to social network 114 and banking 116, may be present in authorization management environment 100. In this example, each of the plurality of web based applications may be used by authorization management system 110 to generate and send user interface for managing authorizations 108 to client device 102 in a process for managing authorizations to personal data.

Also, although authorization management system 110 is shown as a block separate from group of computer systems 126, authorization management system 110 may be implemented in computer system 128. In other examples, authorization management system 110 may be implemented in one or more computer systems in group of computer systems 126.

Further, although social network 114 and banking 116 are shown in the block for authorization management environment 100, each of the plurality of web based applications used by authorization management system 110 may be remote from each other, such as by being in different locations. For example, social network 114 may be located in a first physical location and banking 116 may be located in a second physical location different from the first physical location. In still other examples, each web based application in the plurality of web based applications may be different than the other web based applications by one or more of using different authorizations to access the same personal data, accessing different portions of personal data, providing a different user interface to manage authorizations, using a different application programming interface for retrieving and modifying authorizations, and using a different process for managing authorizations. For example, each web based application may provide a particular representational state transfer (REST) application programming interface that is different from other web based application interfaces.

Figure 2:
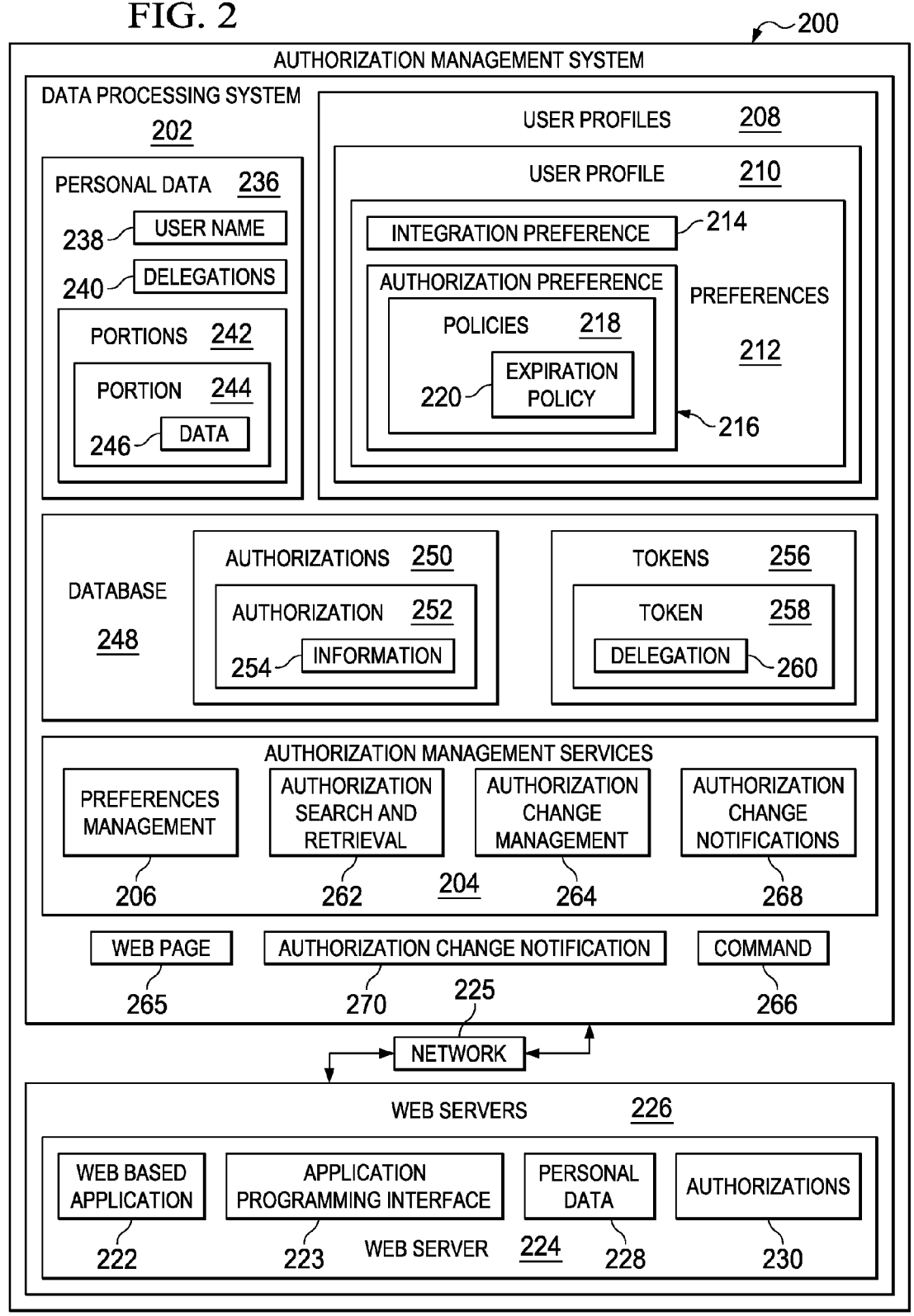
FIG. 2 is a block diagram of components involved in managing authorizations to access personal data in a data processing system in an authorization management system in accordance with an illustrative embodiment.

Turning next to FIG. 2, a block diagram of components involved in managing authorizations to access personal data in a data processing system in an authorization management system is depicted in accordance with an illustrative embodiment. Authorization management system 200 is an example of one implementation of authorization management system 110 in authorization management environment 100 in FIG. 1.

In this illustrative example, data processing system 202 is present in authorization management system 200. Data processing system 202 may be any combination of hardware components implementing authorization management system 200. Data processing system 202 comprises authorization management services 204. In these illustrative examples, authorization management services 204 comprise a number of services that manage authorizations. Preferences management 206 is a service included in authorization management services 204 that manages user profiles of users of authorization management system 200.

As depicted, user profiles 208 include one or more profiles in authorization management system 200 of users of authorization management system 200. In these illustrative examples, user profile 210 is a user profile located in user profiles 208. Each user profile in user profiles 208 is an account or other record of information about a user of authorization management system 200. In these illustrated examples, user profiles, such as user profile 210, include preferences 212 of users of authorization management system 200. Preferences 212 of users may be selected by a user, an administrator, and by a rule using default preferences. For example, a preference in preferences 212 in user profile 210 for receiving authorization change notifications may comprise a preference for using a particular email address to which to send notifications. As another example, a preference in preferences 212 in user profile 210 for sending authorization change notifications may comprise a preference to send notification to a web based application having an expiring authorization to access personal data.

In particular, preferences 212 include at least one of preferences for integration with web based applications of web servers, such as integration preference 214 and preferences for authorizations to access personal data, such as authorization preference 216, and other suitable types of preferences. In these illustrative examples, authorization preference 216 for authorizations to access personal data may include policies 218 for authorizations to access personal data, such as expiration policy 220.

For example, expiration policy 220 may comprise a rule for providing and/or expiring authorizations to access personal data selected from one or more of an absence of a user logging into a web based application for a selected period of time, a change in a status of a selected user, a duration of time passing since the authorization was last verified, a duration of time passing since the authorization was created or modified, a previously selected start time for the access, a change in security policy corresponding to use of the personal data by a web based application, a change in a legal ownership of information in the personal data, and any other suitable change corresponding with a desire to provide and/or expire authorizations to access personal data in authorization management system 200. As another example, expiration policy 220 may comprise a rule for providing a pre-authorization for selected types of authorizations and for selected types of personal data. In this example, the pre-authorization may be based on a preselected delegation, such as a parent delegated to have authority to modify access to personal data of a child and any other suitable delegation in authorization management system 200.

In these illustrative examples, integration preference 214 of user profile 210 includes an identification of one or more web based applications, such as web based application 222. As depicted, integration preference 214 may also include an identification of information for communicating with web based application 222. For example, the information for communicating with web based application 222 may include an identification of application programming interfaces used by web based application 222, such as application programming interface 223. As another example, the information for communicating with web based application 222 may also include identification of networking protocols used by web based application 222 over a network, such as network 225, identification of networking addresses of web based application 222 in network 225, identification of user names and passwords for gaining access to authorizations to access personal data, and any other suitable information for communicating with web based application 222 in authorization management system 200.

In these illustrative examples, application programming interface 223 may include representational state transfer (REST) application programming interfaces. Further, the representational state transfer (REST) application programming interfaces in application programming interface 223 at least include interfaces for retrieving, creating, changing, and deleting states of authorizations to access personal data. For example, an identified networking protocol used by web based application 222 over network 225 may include a representational state transfer (REST) protocol. In this example, the representational state transfer (REST) protocol may include a use of hypertext transport protocols to retrieve, create, change, and delete states of authorizations to access personal data.

As depicted, web based application 222 may be running in one or more web servers, such as web server 224 in web servers 226 in authorization management system 200. In these illustrative examples, web server 224 may use web based application 222 to host one or more web sites, such as social network 114 and banking 116 in FIG. 1. For example, web server 224 may be a centralized authorization server managing authorizations to access personal data for a plurality of web sites. As depicted, web server 224 may include one or more authorizations, such as authorizations 230 to access one or more portions of personal data, such as personal data 228. In these illustrative examples, authorizations 230 to access personal data 228 may be used to filter access to personal data 228. Authorizations 230 to access personal data 228 may be examples of authorizations to access personal data in web based applications of web sites, such as authorizations 122 to personal data 124 and authorizations 118 to personal data 120 in FIG. 1. Authorizations 230 to access personal data 228 may include one or more of an authorization to access particular portions of personal data 228 by one or more selected users, selected groups of users, and entities of web based application 222, an authorization to access a selected set of authorizations in authorizations 230, and any other suitable types of authorizations for filtering access to personal data 228 in authorization management system 200. In these illustrative examples, an authorization to access personal data may comprise a state that is either true or false. For example a state of an authorization to access a particular portion of personal data may be true, indicating that the authorization is provided or false, indicating that the authorization is not provided.

As depicted, personal data 236 may comprise one or more of user name 238, delegations 240, and portions 242 of personal data 236. In these illustrative examples, portion 244 in portions 242 of personal data 236 may be one or more selected portions of personal data 236. Data 246 in portion 244 may comprise one or more of photos, opinions, relationships, memberships, instant messaging identifiers, email identifiers, phone numbers, presence information, and any other suitable portions of personal data of a user of authorization management system 200. Delegations 240 comprise people and entities authorized to access one or more selected portions of personal data 236. For example, delegations 240 may include a delegation of access to data 246 in portion 244 to one or more of relatives, corporate entities, legal entities, and other suitable people and other suitable entities for accessing portions 242 of personal data 236 in authorization management system 200.

In these illustrative examples, database 248 may be used by authorization management services 204 to retrieve and store authorizations 250 corresponding to authorizations 230. As depicted, authorization 252 in authorizations 250 may correspond to one or more authorizations in authorizations 230 based on information 254 in personal data 228. For example, information 254 may be phone in personal data 228 identified by an authorization in authorizations 230. In these illustrative examples, database 248 may also be used by authorization management services 204 to retrieve and store tokens 256, such as token 258 comprising delegation 260.

Authorization search and retrieval 262 is a service included in authorization management services 204 that retrieves authorizations 230 to personal data 228 in authorization management system 200. For example, authorization search and retrieval 262 may retrieve authorizations 230 for a plurality of web based applications to access personal data 228. In this example, each authorization may be for portion 244 of personal data 236 for a corresponding one of the plurality of web based applications. As another example, another retrieval of authorizations 230 by authorization search and retrieval 262 may be based on a selected search terms corresponding to authorizations to personal data. In this example, responsive to receiving a request to search for authorizations to personal data corresponding to the selected search terms, authorization search and retrieval 262 then searches for the authorizations to personal data meeting the selected search terms.

In these illustrative examples, authorization search and retrieval 262 may search for the authorizations to personal data by matching information previously retrieved from web based applications, such as information 254 in database 248. Authorization search and retrieval 262 may also delegate the search request to one or more web based applications by sending the request to the one or more web based applications. Authorization search and retrieval 262 may further identify authorizations to personal data in search results retrieved from one or more web based applications.

Authorization change management 264 is a service included in authorization management services 204 for managing changes to authorizations to personal data in authorization management system 200. As depicted, authorization change management 264 generates a web page for managing retrieved authorizations, such as web page 265. In these illustrative examples, generated web page 265 may comprise a copy of the authorizations to personal data for a plurality of web based applications, options for arranging the authorizations, options for selecting a set of authorizations, and options for selecting a command to apply to the selected set of authorizations, and other suitable information for a web page. Generated web page 265 may be a web page generated for use by a web browser on a graphical user interface. Generated web page 265 may also be a web page generated for use by an audio based web browser.

In these illustrative examples, authorization change management 264 may also receive user input indicating a change to a particular authorization in the copy of the authorizations for a particular web based application in the plurality of web based applications. Responsive to receiving the user input, authorization change management 264 may store the change to the particular authorization in the authorizations for the plurality of web based applications to access the personal data. In these illustrative examples, authorization change management 264 may retrieve and store authorizations to personal data using application programming interface 223.

As depicted, authorization change management 264 may retrieve and store authorizations to personal data by generating and sending commands, such as command 266. For example, authorization change management 264 may generate command 266 as a command to retrieve a particular authorization for the particular web based application, a command to create the particular authorization for the particular web based application, a command to modify the particular authorization for the particular web based application, and a command to delete the particular authorization for the particular web based application. After generating command 266 authorization change management 264 subsequently sends command 266 to the particular web based application for execution by the particular web based application.

Authorization change notifications 268 is a service included in authorization management services 204 that generates and sends authorization change notifications in authorization management system 200. For example, authorization change notifications 268 may generate authorization change notification 270 responsive to determining an authorization should be modified based on expiration policy 220. In these illustrative examples, responsive to authorization change notifications 268 generating authorization change notification 270, authorization change notifications 268 may then send authorization change notification 270. For example, authorization change notifications 268 may use the preference in preferences 212 in user profile 210 for receiving authorization change notifications to send authorization change notification 270. As another example, authorization change notifications 268 may use the preference in preferences 212 in user profile 210 for sending authorization change notifications to send authorization change notification 270 to a web based application having the expiring authorization to access personal data.

The illustration of authorization management system 200 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional services, in addition to the services shown authorization management services 204, may be present within authorization management system 200. For example, a service in services 132 in FIG. 1 to authorize computing devices such as client device 102 in FIG. 1 may be included in authorization management system 200. In this example, the authorization of client device 102 may be required by a policy in policies 218 before client device 102 is allowed access to personal data 228.

As another example, a service in authorization management services 204 in FIG. 2 to synchronize authorizations to access personal data between web based applications, such as web based application 222 and database 248 may be included in authorization management system 200. In this example, the service to synchronize authorizations may execute on a selected intermittent basis to retrieve and compare authorizations 250 to authorizations in each web based application. Further in this example, the service to synchronize authorizations may also execute responsive to a notification from web based application 222 that a change has occurred to an authorization to access personal data that was previously retrieved, changed, and/or deleted by authorization management system 200. Database 248 may also be included in one or more web servers in web servers 226.

As yet another example, one or more web servers in web servers 226 may be located in data processing system 202. In this example, each web server in web servers 226 may be running as one or more applications and/or system services in data processing system 202.

Figure 3:
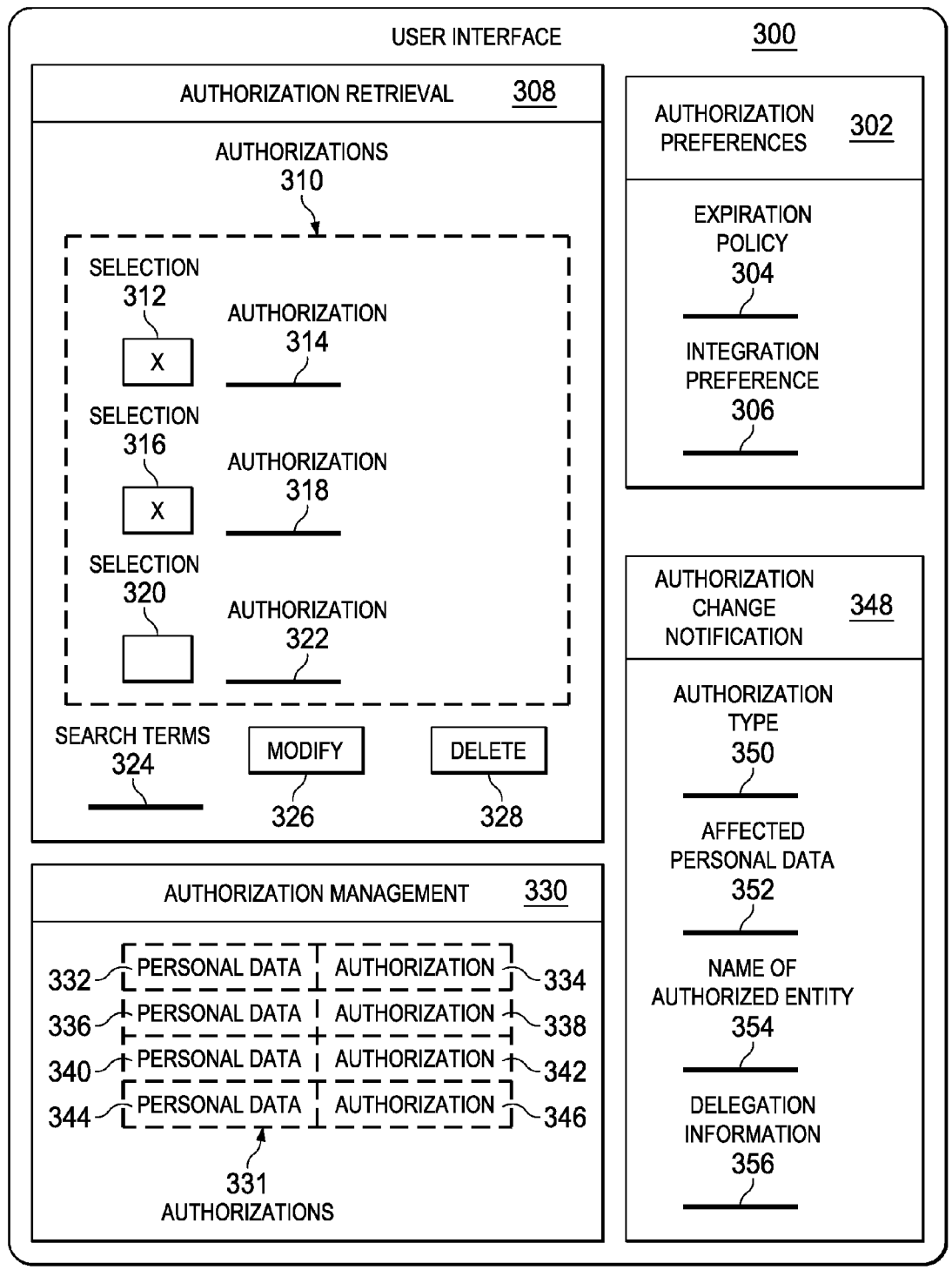
FIG. 3 is an illustration of a user interface for managing authorizations to access personal data in accordance with an illustrative embodiment.

With reference now to FIG. 3, an illustration of a user interface for managing authorizations to access personal data is depicted in accordance with an illustrative embodiment. User interface 300 is an illustrative example of one implementation of a graphical user interface for authorization management services 204 in FIG. 2 in data processing system 202 in FIG. 2. In other illustrative examples, user interface 300 may also be any type of user interface suitable for presenting the contents of user interface 300 to one or more users.

In this illustrative example, user interface 300 includes user interface windows of services in authorization management services 204 in FIG. 2. Authorization preferences 302 is a window present in user interface 300 used to enter and modify preferences, such as preferences 212 in FIG. 2. As depicted, the window of authorization preferences 302 includes selected expiration policy 304 and selected integration preference 306. Selected expiration policy 304 is an example of expiration policy 220 in FIG. 2. Selected integration preference 306 is an example of integration preference 214 in FIG. 2.

Authorization retrieval 308 is a window present in user interface 300 used to search for and retrieve authorizations 310, such as authorizations 230 in FIG. 2. As depicted, the window of authorization retrieval 308 comprises selection 312 for authorization 314, selection 316 for authorization 318, and selection 320 for authorization 322. Selection 312, selection 316, and selection 320 are buttons used to select corresponding authorizations for authorization 314, authorization 318, and authorization 322. Search terms 324 in authorization retrieval 308 is an entry field for a user to enter search terms. For example, responsive to a user entering search terms into search terms 324, authorization search and retrieval 262 in FIG. 2 searches for and retrieves authorizations for display as authorizations 310 corresponding to the search terms entered. Modify 326 is a button in authorization retrieval 308 to initiate a process for modifying selected authorizations. Delete 328 is a button in authorization retrieval 308 to initiate a process for deleting selected authorizations.

Authorization management 330 is a window present in user interface 300 that displays web pages generated by authorization change management 264 in FIG. 2. In this illustrative example, table of authorizations 331 in user interface 300 is an example of web page 265 in FIG. 2. In this illustrative example, table of authorizations 331 includes personal data 332, authorization 334, personal data 336, authorization 338, personal data 340, authorization 342, personal data 344, and authorization 346. Personal data 332, personal data 336, personal data 340, and personal data 344 are examples of portions 242 of personal data 236 in FIG. 2. Authorization 334, authorization 338, authorization 342, and authorization 346 are examples of authorizations 230 in FIG. 2.

In other illustrative examples, not shown, a user may select options for table of authorizations 331 to arrange the authorizations to access personal data in table of authorizations 331 by one or more of an expiration date for each authorization, a domain name of each web based application, the portion of the personal data of the user associated with each authorization, and any other suitable arrangement of the authorizations to access personal data in table of authorizations 331.

In still other illustrative examples, not shown, a user may select options for table of authorizations 331 to select authorizations in table of authorizations 331 by one or more of an expiration date for each authorization, a domain name of each web based application, and a portion of the personal data of the user associated with each authorization in table of authorizations 331. In this example, subsequent to selecting authorizations in table of authorizations 331, a user may then select a command to apply to the selected authorizations. For example, the command may be selected from one of a command to create the selected authorizations in a web based application, a command to modify the selected authorizations, and a command to delete the selected authorizations.

Authorization change notification 348 is a window present in user interface 300 that displays notifications to users based on a determination, by authorization change notifications 268 in FIG. 2, that an authorization should be modified. As depicted, the window of authorization change notification 348 includes information comprising authorization type 350, affected personal data 352, name of authorized entity 354, and delegation information 356. In this illustrative example the information shown in the window of authorization change notification 348 is an example of the information in authorization change notification 270 in FIG. 2.

In this illustrative example, authorization type 350 is an example of information about an authorization in authorizations 230 to access personal data 228 in FIG. 2, affected personal data 352 is an example of information 254 in FIG. 2, name of authorized entity 354 is an example of an entity authorized by the authorization in authorizations 230, and delegation information 356 is an example of delegation 260 in FIG. 2.

Figure 4:
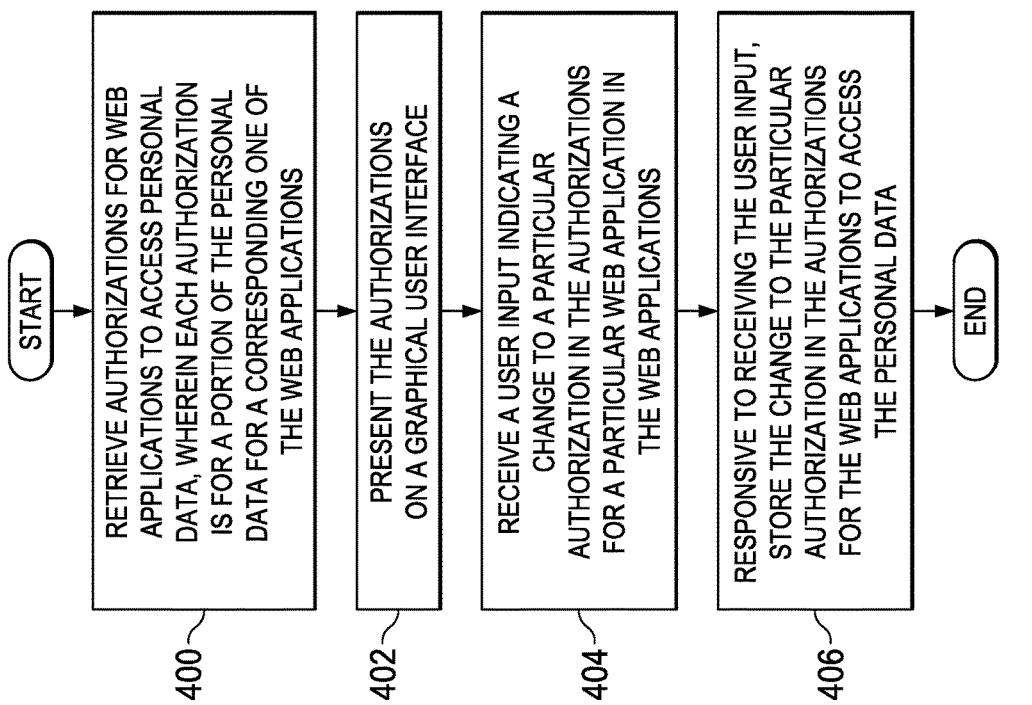
FIG. 4 is a flow chart of a process for managing authorizations to access personal data in accordance with an illustrative embodiment.

Turning next to FIG. 4, an illustrative example of a flowchart of a process for managing authorizations to access personal data is depicted in accordance with an illustrative embodiment. The steps in FIG. 4 may be implemented in authorization management system 200 in FIG. 2. In particular, the steps in the process may be implemented in software, hardware, or a combination of the two in authorization management services 204 in data processing system 202 in FIG. 2.

The process begins by retrieving authorizations for a plurality of web based applications to access personal data, wherein each authorization is for a portion of the personal data for a corresponding one of the plurality of web based applications (step 400). In this illustrated process, the authorizations are an example of authorizations 230 in FIG. 2, the personal data is an example of personal data 228 in FIG. 2, and the plurality of web based applications are examples of web based application 222 in FIG. 2, such as social network 114 and banking 116 in FIG. 1.

The process next presents the authorizations on a graphical user interface (step 402). In this illustrated process, the graphical user interface is an example of user interface for managing authorizations 108 in web browser 106 running on client device 102 in FIG. 1.

The process then receives a user input indicating a change to a particular authorization in the authorizations for a particular web based application in the plurality of web based applications (step 404). Responsive to receiving the user input, the process stores the change to the particular authorization in the authorizations for the plurality of web based applications to access the personal data (step 406) with the process terminating thereafter.

Figure 5:
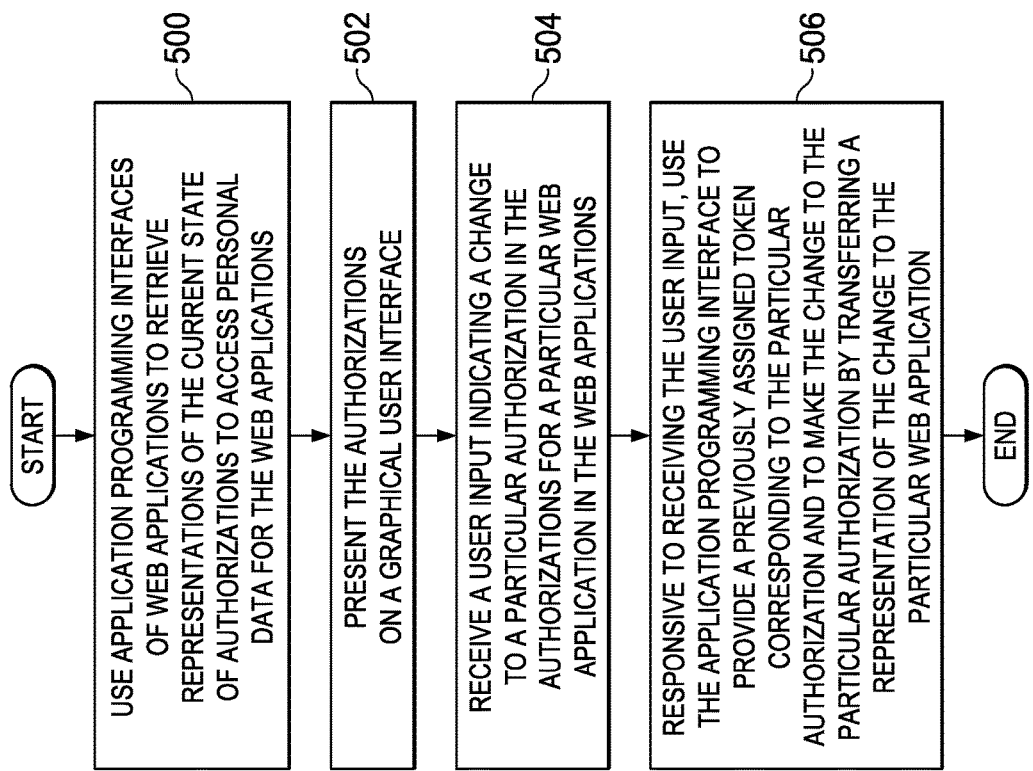
FIG. 5 is a flow chart of a process for retrieving, storing, and modifying authorizations to access personal data in web based applications in accordance with an illustrative embodiment.

Turning next to FIG. 5, an illustrative example of a flowchart of a process for retrieving, storing, and modifying authorizations to access personal data in web based applications is depicted in accordance with an illustrative embodiment. The steps in FIG. 5 may be implemented in authorization management system 200 in FIG. 2. In particular, the steps in the process may be implemented in software, hardware, or a combination of the two using authorization management services 204 in data processing system 202 in FIG. 2.

The process begins by using application programming interfaces of a plurality of web based applications to retrieve representations of the current state of authorizations to access personal data for the plurality of web based applications to access personal data (step 500). In this illustrated process, the application programming interfaces of the plurality of web based applications are examples of application programming interface 223 in FIG. 2, the authorizations are an example of authorizations 230 in FIG. 2, the personal data is an example of personal data 228 in FIG. 2, and the plurality of web based applications are examples of web based application 222 in FIG. 2, such as social network 114 and banking 116 in FIG. 1.

The process next presents the authorizations on a graphical user interface (step 502). The process receives a user input indicating a change to a particular authorization in the authorizations for a particular web based application in the plurality of web based applications (step 504). Responsive to receiving the user input, the process then uses the application programming interface to provide a previously assigned token corresponding to the particular authorization and to make the change to the particular authorization by transferring a representation of the change to the particular web based application (step 506) with the process terminating thereafter.

Figure 6:
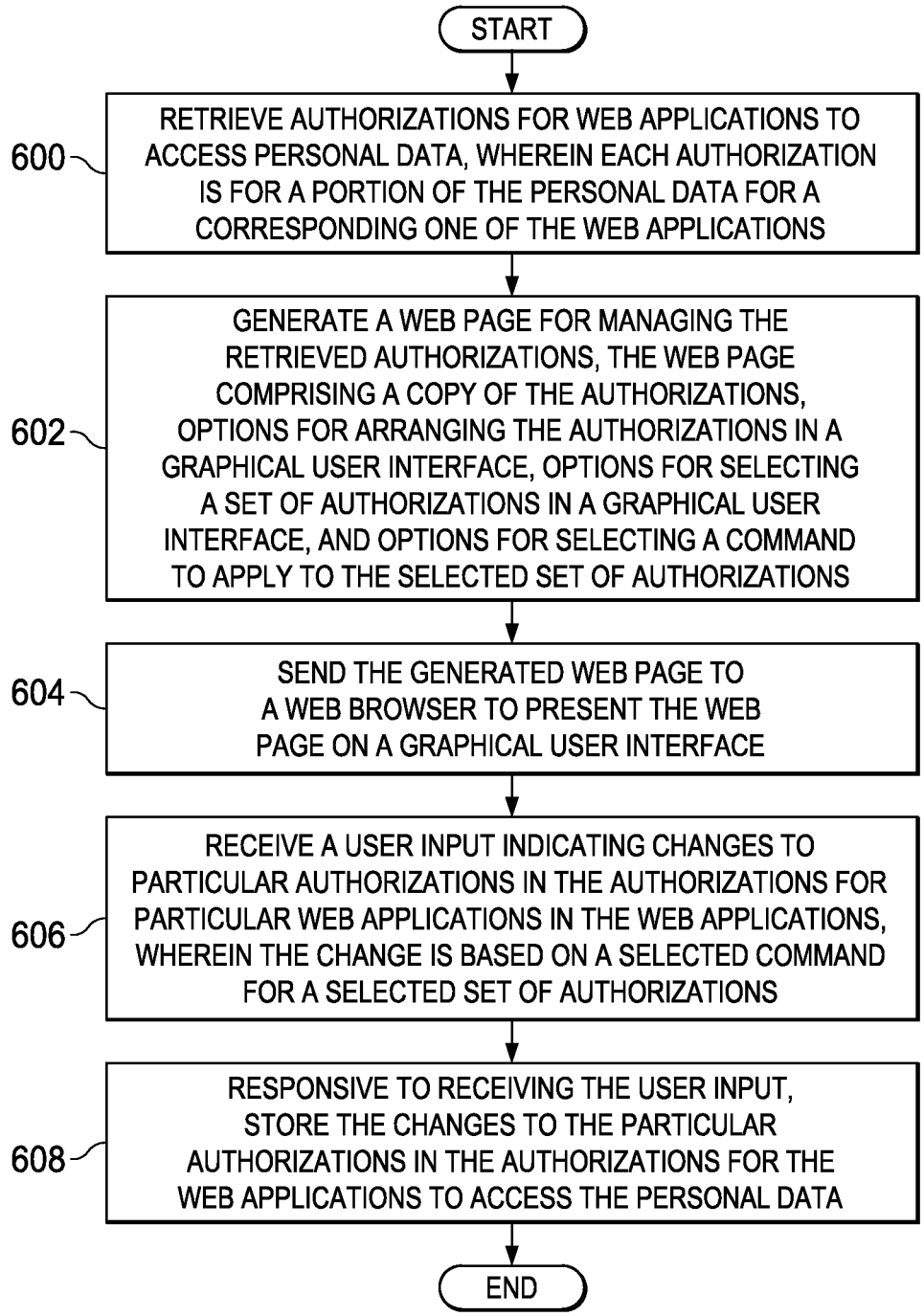
FIG. 6 is a flow chart of a process for generating, presenting, and using a graphical user interface to manage authorizations to access personal data for a plurality of web based applications in accordance with an illustrative embodiment.

Turning next to FIG. 6, an illustrative example of a flowchart of a process for generating, presenting, and using a graphical user interface to manage authorizations to access personal data for a plurality of web based applications is depicted in accordance with an illustrative embodiment. The steps in FIG. 6 may be implemented in authorization management system 200 in FIG. 2. In particular, the steps in the process may be implemented in software, hardware, or a combination of the two in authorization management services 204 in data processing system 202 in FIG. 2. More particularly, the process may be executed in a centralized authorization server, such as a web server for managing authorizations to access personal data by a plurality of web based applications.

The process retrieves authorizations for a plurality of web based applications to access personal data, wherein each authorization is for a portion of the personal data for a corresponding one of the plurality of web based applications (step 600). In this illustrated process, the authorizations are an example of authorizations 230 in FIG. 2, the personal data is an example of personal data 228 in FIG. 2, and the plurality of web based applications are examples of web based application 222 in FIG. 2, such as social network 114 and banking 116 in FIG. 1.

The process next generates a web page for managing the retrieved authorizations, the web page comprising a copy of the authorizations, options for arranging the authorizations in a graphical user interface, options for selecting a set of authorizations in a graphical user interface, and options for selecting a command to apply to the selected set of authorizations (step 602). In this illustrated process, the web page is an example of web page 265 in FIG. 2 and the command is an example of command 266 in FIG. 2.

The process sends the generated web page to a web browser to present the web page on a graphical user interface (step 604). In this illustrated process, the graphical user interface is an example of user interface for managing authorizations 108 and the web browser is an example of web browser 106 running on client device 102 in FIG. 1.

The process then receives a user input indicating changes to particular authorizations in the authorizations for particular web based applications in the plurality of web based applications, wherein the change is based on a selected command for a selected set of authorizations (step 606). Responsive to receiving the user input, the process stores the changes to the particular authorizations in the authorizations for the plurality of web based applications to access the personal data (step 608) with the process terminating thereafter.

Figure 7:
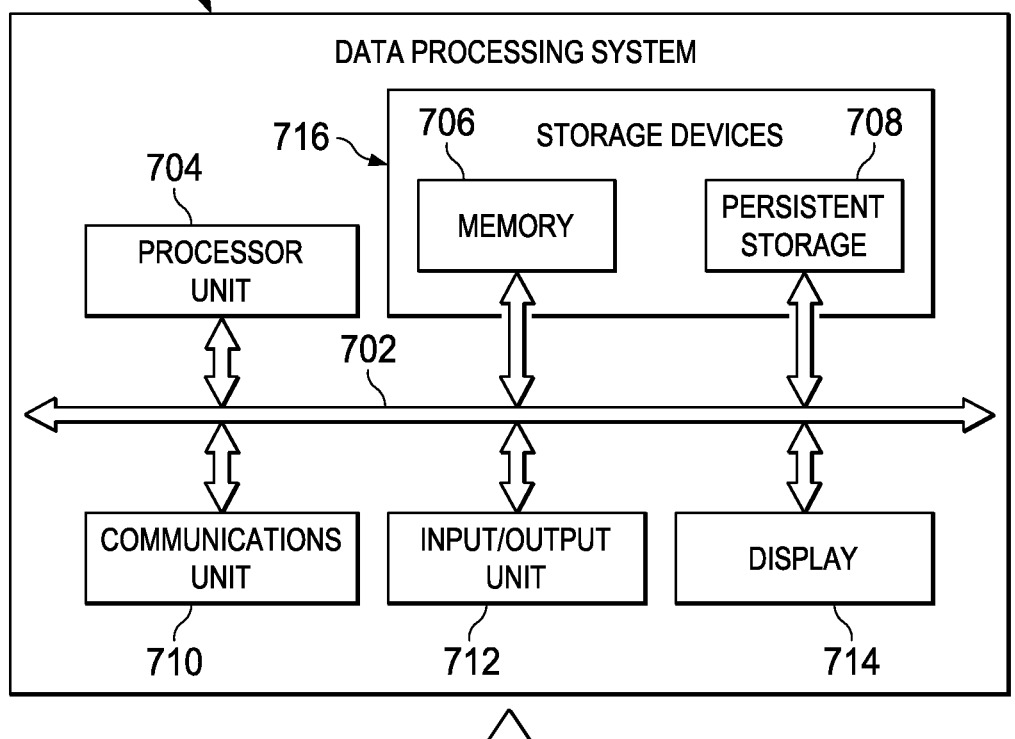
FIG. 7 is an illustration of a data processing system in accordance with an illustrative embodiment.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714. Data processing system 700 is an example of a data processing system that may be used to implement managing authorizations to access personal data in a authorization management system. Data processing system 700 is also an example of a data processing system that may be used to implement authorization management system 110 in FIG. 1, client device 102 in FIG. 1, and computer system 128 in FIG. 1. More particularly, data processing system 700 may be used to implement data processing system 202 in FIG. 2, database 248 in FIG. 2, and web server 224 in FIG. 2.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

Thus, the illustrative embodiments provide a method, apparatus, and computer program product for managing authorizations to access personal data. In one example, a program runs in a computer system and manages authorizations to access personal data for a plurality of web based applications. The program retrieves authorizations for a plurality of web based applications to access personal data. Each authorization retrieved by the program may be an authorization for a portion of personal data for a corresponding one of the plurality of web based applications. The program presents the authorizations on a graphical user interface. The program then receives user input indicating a change to a particular authorization in the authorizations for a particular web based application in the plurality of web based applications. Responsive to receiving the user input indicating the change to the particular authorization in the authorizations, the program then stores the change to the particular authorization in the authorizations for the plurality of web based applications to access the personal data. In another example, the program generates and sends notifications about authorizations to access personal data. In this example, the program generates and sends the notifications based on predefined policies, having rules for authorizing access to personal data and rules for expiring authorizations to access personal data.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

Thus, the illustrative embodiments provide a method, apparatus, and computer program product for managing authorizations to access personal data. The invention solves the problem of managing authorizations of a plurality of web based applications to access personal data, by providing an authorization management system using the plurality of web based applications to generate one user interface for managing each of the authorizations of the plurality of web based applications.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing authorizations to access personal data of a user, the method comprising:
   a computer retrieving, from a plurality of web based applications executing on at least one server data processing system, a set of authorizations authorizing the plurality of web based applications to access the personal data of the user, wherein an authorization of the set of authorizations authorizes an application of the plurality of web based applications to access and modify at least a portion of the personal data of the user;
   presenting the set of authorizations on a graphical user interface, wherein each authorization of the set of authorizations has an expiration date; and
   responsive to receiving a user input indicating a change to a particular authorization in the set of authorizations for a particular web based application in the plurality of web based applications, storing, by the computer, the change to the particular authorization in the set of authorizations for the plurality of web based applications to access the personal data.

2. The method of claim 1, wherein one of the plurality of web based applications is for a first web site and another of the plurality of web based applications is for a second web site, and further comprising:
   generating, by the computer, a command for making the change to the particular authorization and sending, by the computer, the command to the particular web based application.

3. The method of claim 1, wherein the personal data is maintained on the at least one server data processing system and a copy of the set of authorizations for the plurality of web based applications is maintained at the computer.

4. The method of claim 3, wherein retrieving, by the computer, the set of authorizations from the plurality of web based applications comprises using an application programming interface to transfer a representation of a state of the set of authorizations from the web based applications.

5. The method of claim 2, wherein sending, by the computer, the command to the particular web based application comprises using an application programming interface to make the change to the particular authorization by transferring a representation of the change to the particular web based application.

6. The method of claim 1, wherein presenting the set of authorizations on the graphical user interface comprises:
   generating, by the computer, the graphical user interface comprising a copy of the set of authorizations.

7. The method of claim 6, wherein the graphical user interface further comprises options for arranging the set of authorizations in the graphical user interface by one or more of an expiration date for each authorization, a domain name of each web based application, and the portion of the personal data.

8. The method of claim 6, wherein the graphical user interface further comprises options for selecting a portion of the set of authorizations in the graphical user interface by one or more of an expiration date for each authorization, a domain name of each web based application, and the portion of the personal data.

9. The method of claim 8 wherein a command for making the change to the particular authorization is selected from one of a command to create the authorization in the web based application, a command to modify the authorization, and a command to delete the authorization, and wherein the change to the particular authorization in the set of authorizations for the particular web based application in the plurality of web based applications is based on the selected portion of the set of authorizations and the selected command.

10. The method of claim 2, wherein the computer is a centralized authorization server, and wherein the particular web based application in the plurality of web based applications is another centralized authorization server.

11. The method of claim 2 wherein the particular authorization corresponds to a previously assigned token for access to modifying the particular authorization, and wherein sending, by the computer, the command to the particular web based application further comprises:
   sending the previously assigned token corresponding to the particular authorization.

12. An apparatus for managing authorizations to access personal data of a user, the apparatus comprising:
   a processor unit, a memory, and a computer readable storage device;
   first program instructions to retrieve, from a plurality of web based applications executing on at least one server data processing system, a set of authorizations authorizing the plurality of web based applications to access the personal data of the user, wherein an authorization of the set of authorizations authorizes an application of the plurality of web based applications to access and modify at least a portion of the personal data of the user;

second program instructions to present the set of authorizations on a graphical user interface, wherein each authorization of the set of authorizations has an expiration date; and third program instructions to store a change to a particular authorization in the set of authorizations responsive to receiving a user input indicating the change to the particular authorization in the set of authorizations for a particular web based application in the plurality of web based applications, wherein the first program instructions, the second program instructions, and the third program instructions are stored in the computer readable storage device for execution by the processor unit via the memory.

13. The apparatus of claim 12, wherein one of the plurality of web based applications is for a first web site and another of the plurality of web based applications is for a second web site, and further comprising:

fourth program instructions to generate a command for making the change to the particular authorization and send the command to the particular web based application, wherein the fourth program instructions are stored in the computer readable storage device for execution by the processor unit via the memory.

14. The apparatus of claim 12, wherein the personal data is maintained on the at least one server data processing system and a copy of the set of authorizations for the plurality of web based applications is maintained at the computer.

15. The apparatus of claim 14 wherein the first program instructions to retrieve the set of authorizations from the plurality of web based applications comprise program instructions to use an application programming interface to transfer a representation of a state of the set of authorizations from the web based applications, and wherein the program instructions to send the command to the particular web based application comprise program instructions to use the application programming interface to make the change to the particular authorization by transferring a representation of the change to the particular web based application.

16. The apparatus of claim 13 wherein the particular authorization corresponds to a previously assigned token for access to modifying the particular authorization, and wherein the program instructions to send the command to the particular web based application further comprise program instructions to send the previously assigned token corresponding to the particular authorization.

17. A computer program product comprising:

a computer readable storage device in a data processing system;

a program system running on the data processing system for managing authorizations to access personal data of a user;

program instructions, stored on the computer readable storage device, for retrieving, from a plurality of web based applications executing on at least one server data processing system, a set of authorizations authorizing the plurality of web based applications to access the personal data of the user, wherein an authorization of the set of authorizations authorizes an application of the plurality of web based applications to access and modify at least a portion of the personal data of the user;

program instructions, stored on the computer readable storage device, for presenting the set of authorizations on a graphical user interface, wherein each authorization of the set of authorizations has an expiration date; and program instructions, stored on the computer readable storage device, responsive to receiving a user input indicating a change to a particular authorization in the set of authorizations for a particular web based application in the plurality of web based applications, for storing the change to the particular authorization in the set of authorizations for the plurality of web based applications to access the personal data.

18. The computer program product of claim 17, wherein the program system comprises a plurality of programs and wherein one program in the program system running on the data processing system causes another program to be downloaded to the data processing system while managing the authorizations to access the personal data.

19. The computer program product of claim 17, wherein the program instructions are downloaded over a network from a remote data processing system to the computer readable storage device in the data processing system.

20. The computer program product of claim 19, wherein the computer readable storage device in the data processing system is a first computer readable storage device in a server data processing system, and wherein the program instructions are downloaded over the network to the remote data processing system for use in a second computer readable storage device in the remote data processing system.

* * * * *